(12) United States Patent
Schuler

(10) Patent No.: US 6,706,976 B1
(45) Date of Patent: Mar. 16, 2004

(54) PORTABLE PLATFORM SCALE

(75) Inventor: Daniel D. Schuler, Griswold, IA (US)

(73) Assignee: Schrran Engineering, Inc., Griswold, IA (US)

( * ) Notice: Subject to any disclaimer, the term of this patent is extended or adjusted under 35 U.S.C. 154(b) by 222 days.

(21) Appl. No.: 10/007,873

(22) Filed: Dec. 6, 2001

(51) Int. Cl.⁷ .................... G01G 21/00; G01G 19/02
(52) U.S. Cl. .................... 177/126; 177/132; 177/134; 177/135
(58) Field of Search ................ 177/126, 132–135

(56) References Cited

U.S. PATENT DOCUMENTS 4,281,728 A * 8/1981 Dickason et al. .......... 177/134

FOREIGN PATENT DOCUMENTS

GB 2127159 * 4/1984 ................ 177/132

OTHER PUBLICATIONS

J–Star Industries; Title: J–Star 7'×10' Platform Scale; published in May 1988, Fort Atkinson, WI 53538.

* cited by examiner

Primary Examiner—Randy Gibson

(57) ABSTRACT

A modular portable platform scale system includes at least one portable scale platform, and more preferably two side-by-side platforms, detachably connected to and vertically supported by a pair of movable forward and rear ramps. A coupling can be used to connect and support the scale platforms in an end-for-end arrangement to construct longer scales.

15 Claims, 5 Drawing Sheets

PORTABLE PLATFORM SCALE

BACKGROUND OF THE INVENTION

The present invention relates to the field of scales for weighing cargo carried by a truck or other vehicle. More particularly, this invention relates to a portable, modular, drive-over scale that can quickly be assembled without the use of heavy equipment in a field or any other area where cargo is to be weighed. The scale of this invention advantageously adapts to accurately weigh trailers or vehicles having single and/or tandem axles and single and/or dual inboard and outboard wheels.

It is often desirable to determine the weight of the cargo carried by a trailer or vehicle. Transportation laws provide penalties if a vehicle exceeds established weight restrictions for roads and bridges. In the case of agricultural products, payment may be based on the weight of the product or cargo delivered. Therefore, it is very important to accurately determine the weight of the cargo. Grain elevators and highway weigh stations typically utilize fixed platform scales with large, heavy platforms that extend over conventional weighing mechanisms located in a pit below the platform. The platform is usually constructed of heavy gauge structural steel and is at least 7'long and 10', wide in order to accommodate the tandem axles of a semi-tractor trailer.

For various reasons, including avoiding the risk of fines for exceeding legal weight limits, it is often desirable to check the weight of a cargo-carrying vehicle in the field. To meet this need, "portable" platform scale systems, such as the J-STAR 7'×10' Platform Scale System, have been developed and used for many years. The J-STAR 7'×10' Platform Scale System includes a low profile rectangular scale housing with weigh beams bolted to a heavy gauge structural steel platform. A three-point tractor hitch lift attachment and detachable ramps are included with some models, but the housing ultimately supports the scale platform during use. A portable indicator stand holds a microprocessor-based electronic scale indicator that also controls the weighing operation. The indicator is powered by a 12-volt DC battery. The indicator is electrically connected to the strain gauge load cells associated with the weigh beams.

The J-STAR scale system can weigh cargo in the field, but has some shortcomings. First, the device generally has to be placed on a large area with a smooth, level surface to obtain the most accurate results. Smooth, level surfaces are not always available in the field. Second, the size and weight of the "portable" platform assembly make it impossible for a person to position the assembly without the assistance of heavy equipment, such as a tractor or forklift. Such equipment is not always readily available for use. Third, the 7'×10' platform scale assembly requires considerable space for storage and transportation. Fourth, the bolting of the platform to the weigh bar(s) tends to leave undesirable ridges or irregularities in the scale platform. Thus, it can be seen that there is a need for an improved portable platform scale that is truly portable.

Therefore, a primary objective of the present invention is the provision of an improved platform scale.

A further objective of the present invention is the provision of a portable platform scale that does not require a level weighing surface to provide accurate results.

A further objective of this invention is the provision of a portable platform scale that is modular in design and can be quickly assembled manually without the use of a lifting device.

A further objective of this invention is the provision of a portable platform scale that has an interlocking I-beam construction.

A further objective of this invention is the provision of a portable platform scale wherein the scale platform is supported as a simple beam by a pair of ramps.

A further objective of this invention is the provision of a portable platform scale wherein the scale platform interlocks with the ramp or a coupling device by a connection that utilizes a cradle and an upright post on the ramp or coupling device, the post being received by a hole in the weigh bar attached to the scale platform.

These and other objectives will be apparent from the drawings, as well as from the description and claims that follow.

BRIEF SUMMARY OF THE INVENTION

The present invention relates to the field of scales for weighing cargo carried by a vehicle. More particularly, this invention relates to a portable, modular, drive-over scale system that includes at least one portable scale platform, and more preferably two side-by-side platforms, detachably connected to and vertically supported by a pair of movable forward and rear ramps.

The scale platforms are vertically supported in a trough formed on an upright plate member of the ramps. A bar rigidly attached to the underside of the scale platform rests in the trough. Advantageously, the support bar can be a weigh bar equipped with strain gauges thereon. The bar has a vertical hole therethrough that slidably receives an upright post formed on the ramp. Thus, the scale platform is detachably connected to the ramp.

A coupling with a similar trough and connector post structure can be used to connect and support the scale platforms in an end-for-end arrangement to construct longer scales.

DETAILED DESCRIPTION OF THE INVENTION

Figure 1:
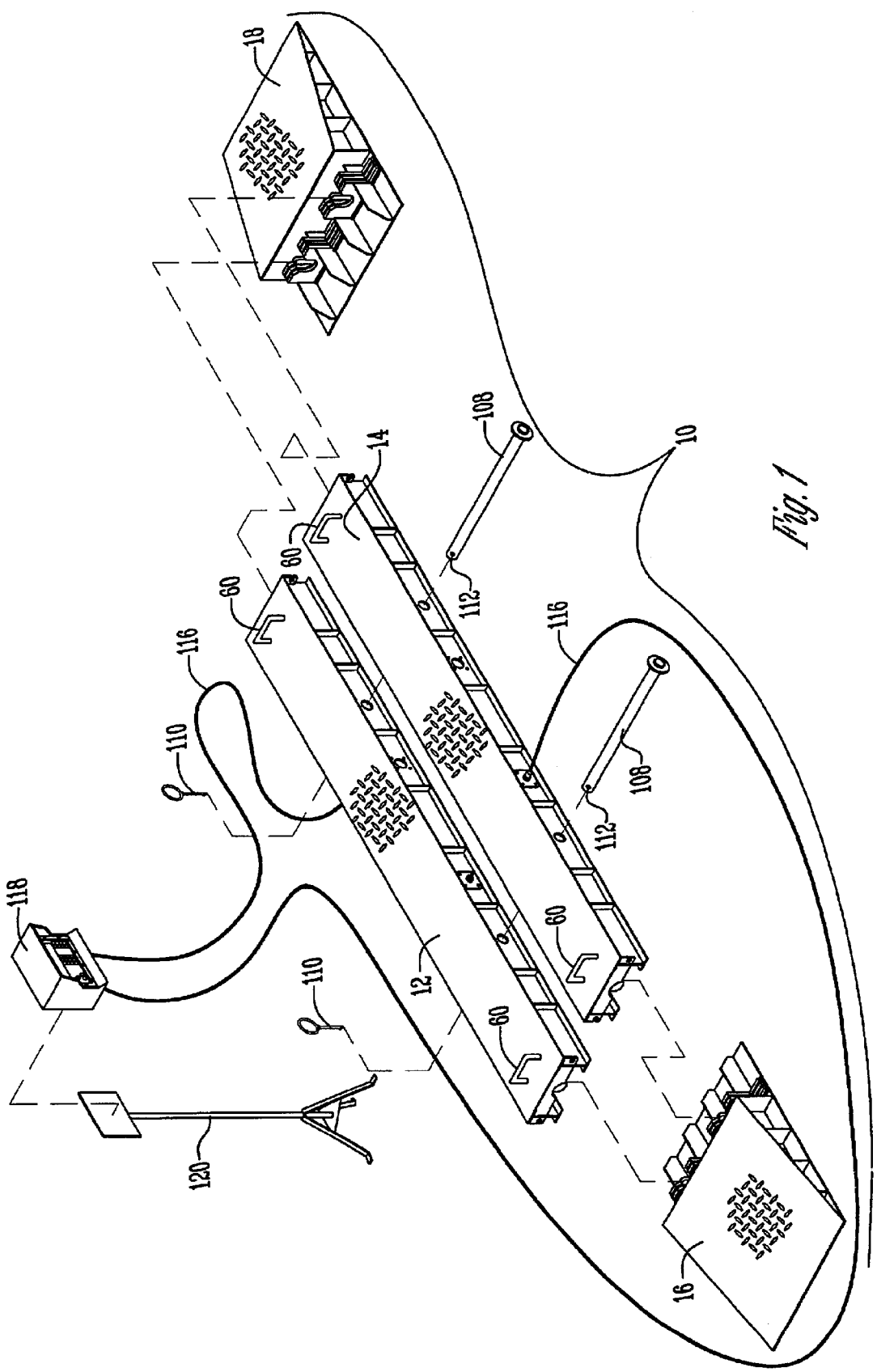
FIG. 1 is an exploded assembly view that shows the portable platform scale system of the present invention in perspective.
Figure 2:
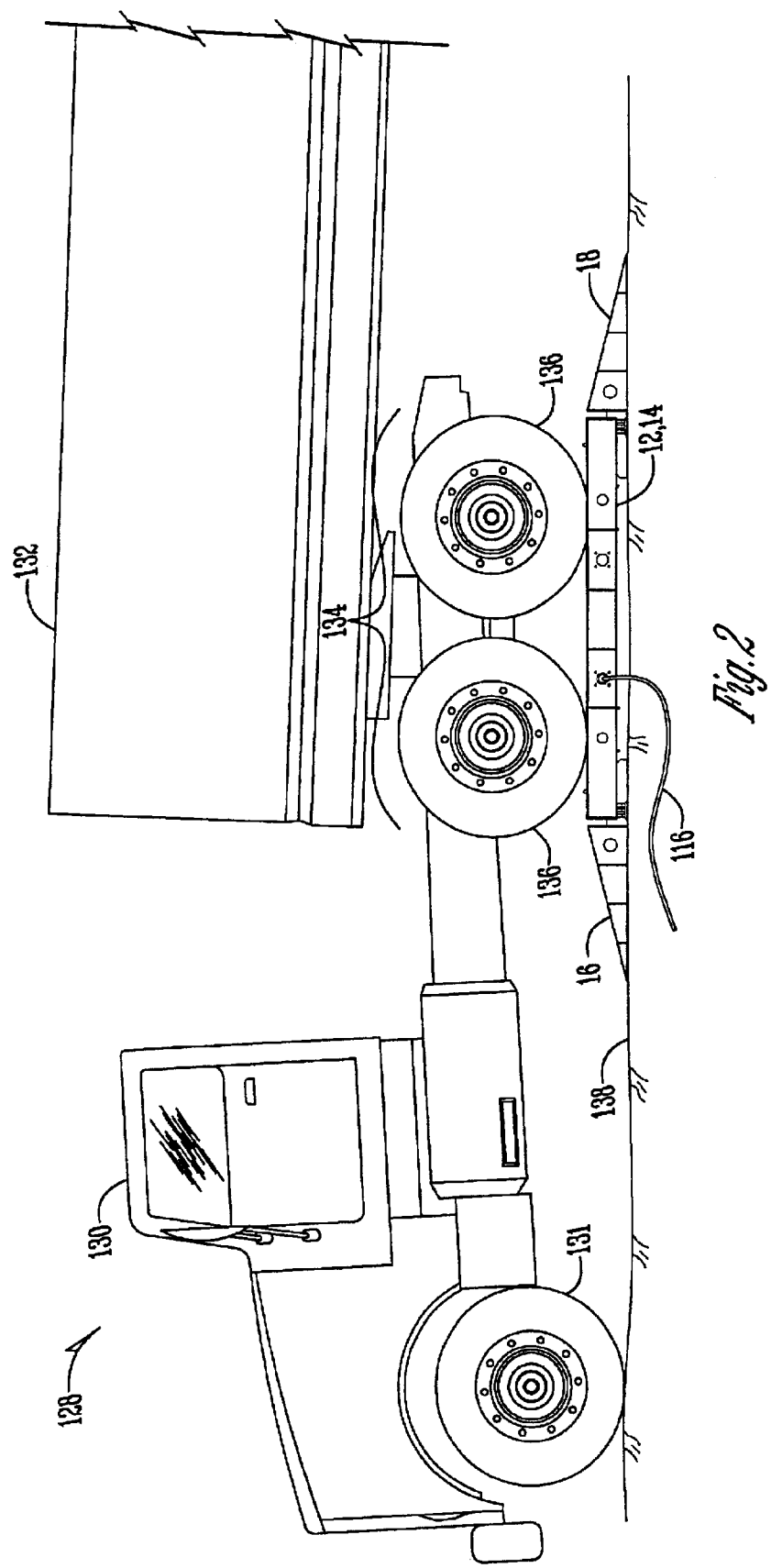
FIG. 2 is a side elevation view that illustrates the use of the portable platform scale of this invention to determine the weight of a cargo-carrying vehicle.
Figure 3:
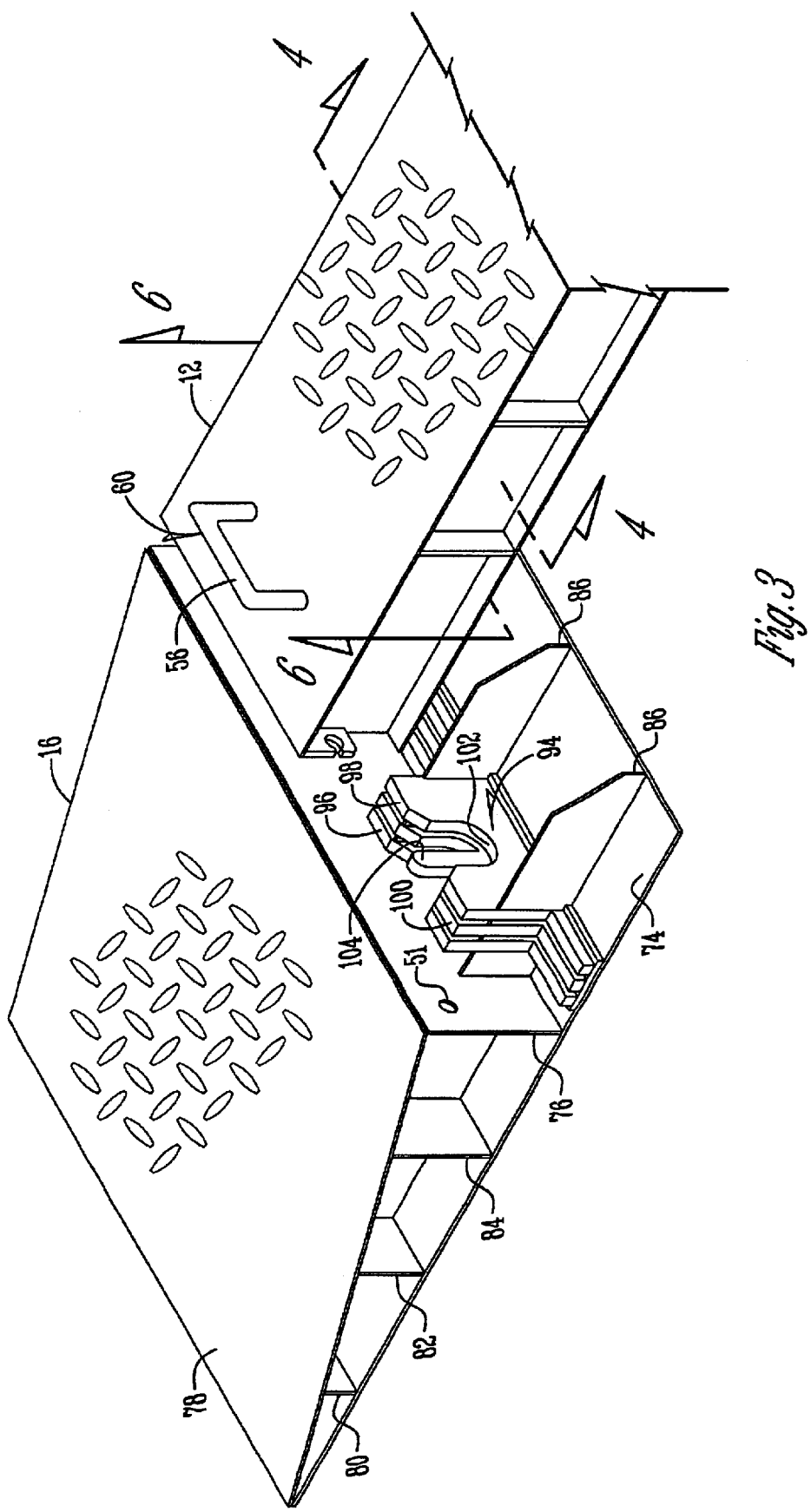
FIG. 3 is a partial perspective view that illustrates the means for supporting the scale platform on the ramp and connecting the scale platform to the ramp according to this invention.

In the drawings and description below, the portable platform scale of this invention is generally designated by the reference numeral 10. As best seen in FIGS. 1–3, the scale 10 includes one or more, preferably two, elongated independent scale platforms 12, 14. A forward ramp 16 and a rear ramp 18 support the scale platforms 12, 14 therebetween from the underneath like simple beams. The scale platforms 12, 14 detachably connect to the ramps 16, 18. Preferably the scale platforms 12, 14 are spaced apart slightly in a lateral direction and are substantially identical although arranged in a mirror image manner to allow electrical connections to be accessed readily. Therefore only the structure of the scale platform 12 is described in detail below.

Figure 4:
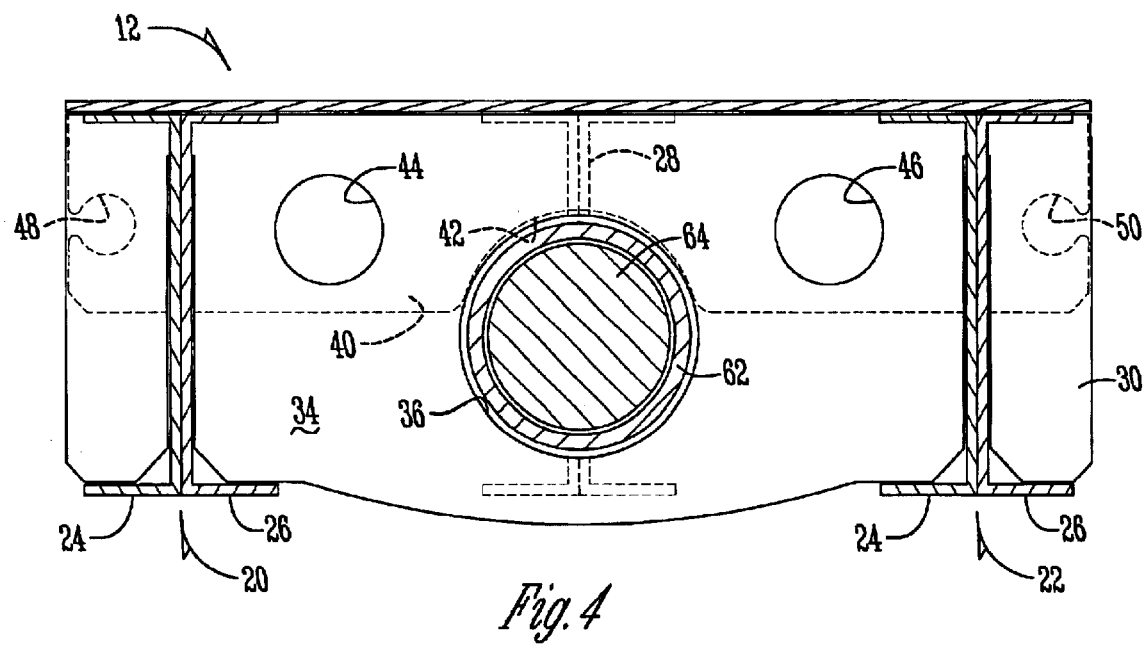
FIG. 4 is a cross-sectional view of the scale platform taken along line 4—4 in FIG. 3.
Figure 6:
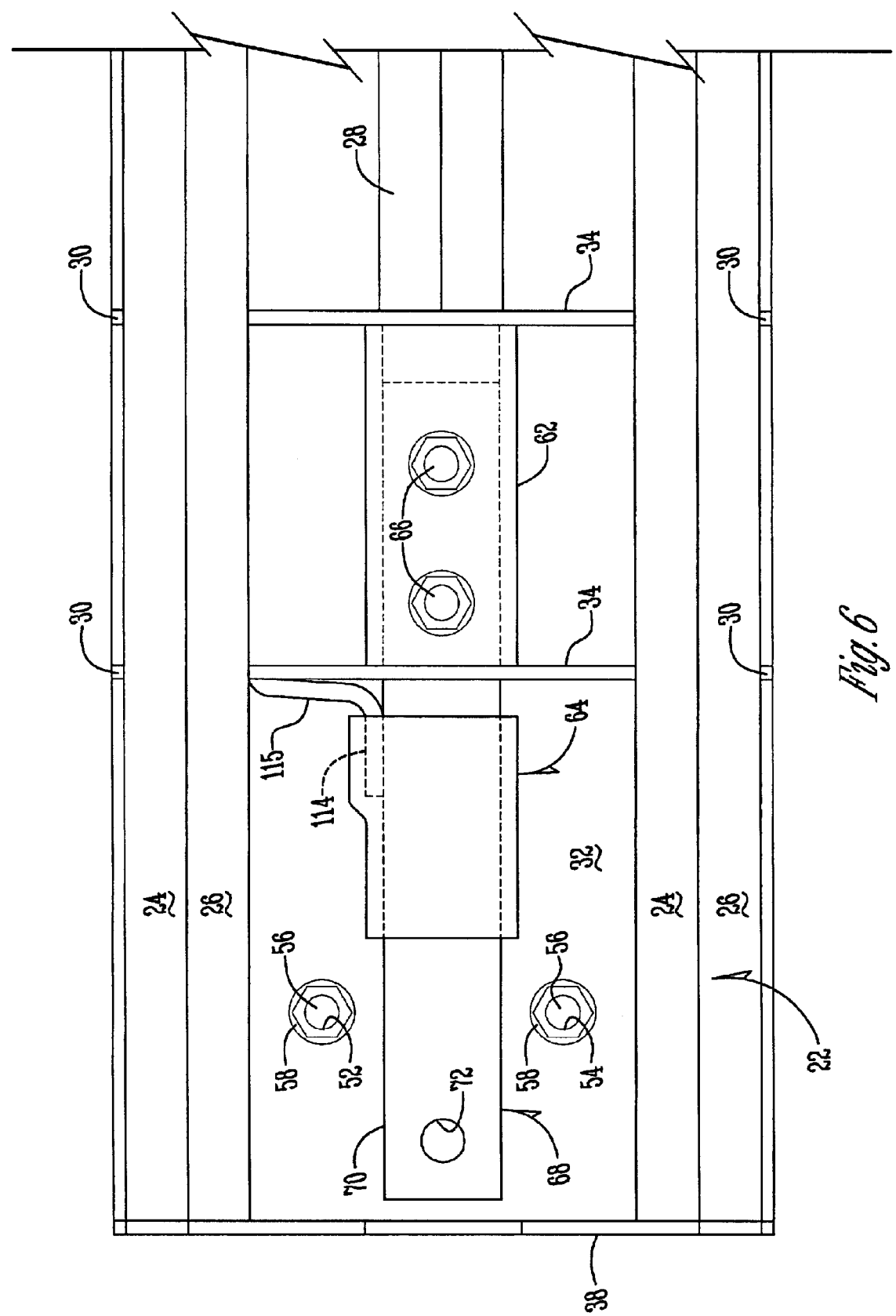
FIG. 6 is a plan view of the bottom of the scale platform taken along line 6—6 in FIG. 3 and, among other things, further illustrates the means for connecting the scale platform to the ramps or the coupling member.

Referring to FIGS. 3, 4, and 6, the scale platform 12 includes a pair of laterally spaced, preferably parallel upright side rails 20, 22. The side rails 20, 22 are I-beams preferably formed by welding or otherwise permanently joining two U-shaped channel members 24, 26 back to back as shown. A plurality of ribs 30 attach to the side rails 20, 22 as shown to provide additional structural rigidity and strength. A substantially planar horizontal top plate 32 attaches to the I-beam side rails 20, 22. A center rail 28 that is constructed similar to the side rails 20, 22 also attaches to the underside of the top plate 32.

Cross members 34 internally connect the side rails 20, 22 and the top plate 32. The central portion of the cross member 34 also has a round hole 36 therein. End plates 38, 40 are welded to and extend partially downward from the top plate 32 as shown. An arcuate clearance recess 42 in the end plates 38, 40 generally registers with the upper portion of the hole 36. The central portion of the cross member 34 also includes holes 44, 46 therethrough. Holes or sockets 52, 54 extend through the end plates 38, 40 adjacent the outer lateral edges thereof. Preferably the above-mentioned components are fabricated from steel and attached together by welding or other suitable means.

As best seen in FIGS. 1 and 6, two sets of laterally spaced holes 52, 54 extend through the top plate 32 generally adjacent to the respective end plates 38, 40. A U-shaped bolt 56, which has threaded ends that pass through the holes 52, 54 as shown, secures to the plate by nuts 58 to form an extendable handle 60 that automatically retracts by gravity when released.

A hollow cylindrical weigh bar holder tube 62 extends substantially horizontally between two of the cross members 34 that are closest to the respective end plates 38, 40 and concentrically surrounds the holes 36 in those cross members. The weigh bar holder tube 62 is preferably steel and attaches by welding or other suitable means to the cross members 34. A weigh bar 64 slidably inserts into the holder tube 62 and is secured by a pair of bolts 66. As is conventional, the weigh bar 64 includes a set 114 of strain gauges thereon that measure the strains on the weigh bar as indications of the weight placed on the scale platform 12 to which the bar is secured. The weigh bar 64 has a substantially cylindrical outer portion 68 that extends to a position inwardly adjacent to the recess 42 of end plate 38 or 40. The outer portion 68 has an outer diameter 70 and a hole 72 extending vertically thereinto, or more preferably completely therethrough. The weigh bar 64 is preferably a conventional 2¾ inch round hitch bar available from Weigh Tronix of Fairmont, Minn., U.S.A.

The ramps 16, 18 are essentially identical in their construction. The description below refers primarily to the construction of the forward ramp 16, but is equally applicable to the rear ramp 18. The ramp 16 includes a substantially flat planar base plate 74 that extends horizontally, an upright riser plate 76, and an inclined plate 78 that extends at an acute angle, preferably a shallow angle of 30 degrees or less, from the base plate 74 to the top edge of riser plate 76. A plurality of longitudinal and transverse support braces 80, 82, 84, 86 interconnect the base plate 74, the riser plater 76, and the inclined plate 78 to provide additional strength and rigidity for the ramp 16.

A pair of cradles 94 are formed on the non-inclined portion of the ramp 16. The cradles 94 are actually formed by three spaced apart vertically oriented plates 96, 98 and 100. All three plates 96, 98, 100 have a semi-circular trough 102 formed therein. The troughs 102 register with each other to form the cradle 94 for receiving the outer cylindrical portion 68 of the weigh bar 64. However, the intermediate plate 100 has an upright, more preferably vertical, connector post 104 protruding from the central portion of the trough 102. The connector post 104 slidably extends into the receiving hole 72 in the weigh bar 64 to further connect the scale platform 12 or 14 to the ramp 16 or 18. The outer diameter 70 of the weigh bar 64 rests in the trough 102. Thus, the cradles 94 on the ramps 16, 18 vertically support the scale platforms 12, 14 from underneath in a free floating manner like simple beams. As best understood in view of FIG. 2, this arrangement can tolerate some irregularity in the ground 138 under the scale platforms 12, 14 without adversely affecting the accuracy of the scale 10.

Referring again to FIG. 1, a pair of longitudinally spaced holes 106 extends transversely through each of the scale platforms 12, 14. A corresponding pair of alignment pins 108, each of which has an enlarged head and a shaft extending therefrom, extends through the holes 106 to tie the two platforms 12, 14 together, if desired to facilitate movement and placement. A conventional spring-loaded pull pin 110 inserts in a hole 112 in the pin 108 to prevent its inadvertent withdrawal.

Referring to FIGS. 1 and 6, the strain gauge set 114 has an electrical wire 115 extending therefrom. The wire 115 passes through one of the holes 44 or 46 and connects to a cord 116 that connects to a conventional indicator/control unit 118. The indicator 118 is a programmable microprocessor that is preferably powered by a 12-volt DC battery and has a digital display. The indicator 118 detachably attaches to a portable stand 120.

The scale platforms 12, 14 are preferably approximately 60 inches long by 12 inches wide and 5 inches high. The ramps 16, 18 are approximately 34 inches long by 24 inches wide and 6 inches high. Even when these components are constructed of steel, the scale platforms 12, 14 weigh only approximately 150 pounds each. The ramps 16, 18 weigh approximately 80 pounds each. Thus, these components can be manually lifted and positioned by the user without the aid of heavy equipment.

To assemble the portable platform scale 10, the user positions one of the ramps 16 or 18 in the desired location. Then the user places the scale platforms 12, 14 so that they are cradled by and connected to the ramp 16 or 18. Next the user raises the other end of the scale platforms 12, 14, positions the other ramp 16 or 18 thereunder, and lowers the scale platforms 12, 14 into cradled connection therewith.

The optional alignment pins 108 can be installed at this point. A second portable platform scale 10 is assembled in the same manner and laterally spaced from the first portable scale so that left and right wheel sets of the vehicle can be weighed.

As illustrated in FIG. 2, a pair of the portable platform scales 10 of this invention can be used to weigh a cargo-carrying vehicle 128. The vehicle 128 includes a semi-tractor 130 with wheels 131 thereon and a trailer 132 with a tandem axle 134 having pairs of dual inboard and outboard wheels 136 on the ends thereof. The driver pulls the vehicle 128 forward until the wheels 136 climb up the rear ramp 18 and are positioned on the scale platforms 12, 14. The indicator/control unit 118 receives the signals from the strain gauge sets 114 and combines the weights to arrive at and display the total weight supported by the tandem axle 134. When the weighing operation is completed, the driver pulls the vehicle 128 forward and the wheels 136 roll down the forward ramp 16.

Among the advantages of the portable platform scale 10 of this invention is its modular construction. The portable platform scale 10 of the first embodiment described above easily fits into the back of a pickup truck in an unassembled condition. The assembled scale 10 can also be moved as a unit by inserting pull pins 110 through the holes 48, 50 in the scale platforms 12, 14 respectively and into the holes 51 in the adjacent ramp 16, 18. See FIGS. 1, 3 and 4.

Figure 5:
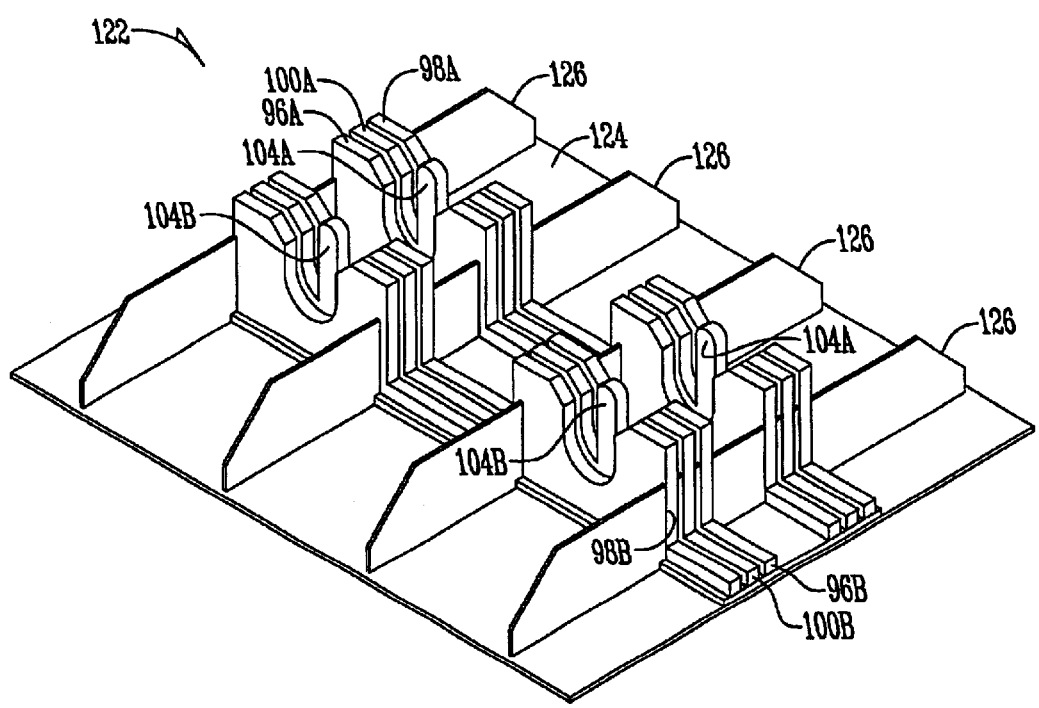
FIG. 5 is a perspective view of a coupling member that can be used to connect multiple scale platforms together to form a longer scale platform between the ramps.

An elongated second embodiment of the scale 10 of this invention is also possible. In this embodiment, a coupling 122 (FIG. 5) connects and supports pairs of scale platforms 12, 14 placed end-to-end. Pull pins 110 can be inserted through the holes 48, 50 to help align the scale platforms, but such pins should be removed for operation. The coupling 122 includes a substantially flat planar base plate 124 and a plurality of substantially upright, laterally spaced braces 126 attached thereto. Similar to the ramps 16, 18, the coupling 122 has two sets of longitudinally spaced, preferably parallel, upright plates 96A, 98A, 100A and 96B, 98B, 100B that form cradles. Upright connector posts 104A and 104B are formed on the intermediate plates 100A and 100B respectively as shown.

One skilled in the art will appreciate that connector posts 104, 104A, 104B could be positioned at the free end of the weigh bar 64 rather than in the hole 72. The posts 104, 104A, 104B would then act as stop members to limit longitudinal sliding of the weigh bars 64 and thereby the scale platforms 12, 14.

Of course, the separate scale platforms 12, 14 could be replaced by a single combined platform if the combined platform could be made light enough for the user to move it manually and yet strong enough to support the loads being measured.

Thus, it can be seen that the present invention at least achieves its stated objectives.

In the drawings and specifications, there has been set forth a preferred embodiment invention, and although specific terms are employed, these are used in a generic and descriptive sense only and not for purposes of limitation. Changes in the form and proportion of parts as well as in the substitution of equivalents are contemplated as circumstances may suggest or render expedient without departing from the scope of the invention as defined in the following claims.

What is claimed is:

1. A portable platform scale comprising:
   a first longitudinally spaced pair of movable forward and rear ramps;
   an elongated portable scale platform including a forward end portion detachably connected to and vertically supported by the forward ramp and a rear end portion detachably connected to and vertically supported by the rear ramp;
   weighing means operatively associated with the scale platform for determining a cargo weight placed on the scale, wherein said weighing means is located only within the end portions; and
   wherein the scale platform comprises a forward section and a rear section detachably connected together and supported by a coupling located between and aligned with the ramps.

2. The scale of claim 1 comprising a second scale platform including a forward end portion detachably connected to and vertically supported by the forward ramp and a rear end portion detachably connected to and vertically supported by the rear ramp.

3. The scale of claim 1 comprising a second pair of forward and rear ramps with at least one elongated portable scale platform supported by and detachably mounted therebetween, the second pair of forward and rear ramps being laterally spaced from the first pair of forward and rear ramps.

4. The scale of claim 3 wherein the at least one scale platform includes a first scale platform and a second scale platform arranged side-by-side.

5. The scale of claim 3 wherein the second pair of ramps are aligned with and parallel to the first pair of ramps.

6. A portable platform scale comprising:
   a first longitudinally spaced pair of movable forward and rear ramps;
   an elongated portable scale platform including a forward end portion detachably connected to and vertically supported by the forward ramp and a rear end portion detachably connected to and vertically supported by the rear ramp;
   weighing means operatively associated with the scale platform for determining a cargo weight placed on the scale; and
   wherein the weighing means includes a first weigh bar rigidly attached to the forward end portion of each scale platform so as to extend longitudinally therealong and a second weigh bar rigidly attached to the rear end portion of each scale platform so as to extend longitudinally therealong and wherein the forward ramp and the rear ramp each have a longitudinal trough formed therein for slidably receiving and vertically supporting the first and second weigh bars respectively.

7. The scale of claim 6 wherein the weighing means includes a weight indicator unit having a programmable microprocessor electrically connected to the weigh bars.

8. The scale of claim 6 wherein stop means protrude upwardly into the trough of each ramp for inhibiting the longitudinal movement of the weigh bars.

9. The scale of claim 8 wherein each ramp has an upright plate thereon having the trough formed therein and the stop means is an upright connector post formed on the plate so as to extend upwardly into the trough.

10. A portable platform scale comprising:
   a movable forward ramp;
   a movable rear ramp;
   an elongated portable scale platform including a forward end portion detachably connected to and vertically supported by the forward ramp and a rear end portion detachably connected to and vertically supported by the rear ramp;
   a first elongated bar rigidly attached to the forward end portion of the scale platform and extending longitudinally thereunder;
   a second elongated bar rigidly attached to the rear end portion of the scale platform so as to extend longitudinally thereunder;
   the forward ramp and the rear ramp each have a longitudinal trough formed therein for slidably receiving and vertically supporting the first and second bars respectively; and strain gauges operatively associated with the bars for determining a cargo weight placed on the scale platform.

11. The scale of claim 10 wherein the scale platform comprises a pair of substantially parallel I-beam side rails vertically supporting a substantially planar horizontal top plate.

12. The scale of claim 10 wherein the forward ramp and the rear ramp each have an upright connector post formed thereon and the first and second bars each include a vertical hole therein for slidably receiving the connector post.

13. The scale of claim 10 wherein the scale platform includes first and second platform sections arranged end-to-end and connected together by an intermediate coupling member, each of the platform sections having a pair of the first and second bars thereon.

14. The scale of claim 10 wherein the scale platform includes first and second platform sections arranged side-by-side.

15. A portable platform scale for weighing an individual vehicle having dual wheels comprising:
- a pair of independently movable laterally spaced left and right portable forward ramps;
- a pair of independently movable laterally spaced left and right portable rear ramps;
- a pair of independently movable laterally spaced and elongated portable left and right scale platforms;
- the left scale platform having a forward end portion detachably connected to and vertically supported by the left forward ramp and rear end portions detachably connected to and vertically supported by the left rear ramp;
- the right scale platform having a forward end portion detachably connected to and vertically supported by the right forward ramp and a rear end portion detachably connected to and vertically supported by the right rear ramp;
- weighing means including a programmable microprocessor with a display unit connected thereto and a plurality of strain gauges mounted on each of the scale platforms so as to generate signals to the microprocessor indicative of the weight supported by each of the scale platforms; and
- wherein each of the right and left scale platforms includes a pair of separately formed and independent elongated inboard and outboard platform sections each including a forward end portion detachably connected to the corresponding forward ramp and a rear end portion detachably connected to the corresponding rear ramp, whereby the inboard sections are adapted to support inboard wheels of the dual wheels and the outboard sections are adapted to support outboard wheels of the dual wheels.

\* \* \* \* \*